United States Patent [19]

Palardy et al.

[11] Patent Number: 5,755,971
[45] Date of Patent: May 26, 1998

[54] INHIBITION OF CALCIUM OXALATE SCALE IN AQUEOUS BASED SOLUTIONS

[75] Inventors: William J. Palardy, Chalfont; Nancy A. DiAngelo, Feasterville, both of Pa.

[73] Assignee: BetzDearborn Inc., Trevose, Pa.

[21] Appl. No.: 801,272

[22] Filed: Feb. 18, 1997

[51] Int. Cl.$^6$ ..................................... C02F 5/14
[52] U.S. Cl. ................... 210/697; 210/698; 252/180; 252/181; 435/161
[58] Field of Search ................... 210/697, 698; 252/180, 181; 435/161

[56] References Cited

U.S. PATENT DOCUMENTS

| | | | |
|---|---|---|---|
| 1,997,256 | 4/1935 | Hall | 210/697 |
| 2,299,748 | 10/1942 | Hatch | 210/697 |
| 2,358,222 | 9/1944 | Fink et al. | 210/697 |
| 3,085,975 | 4/1963 | Jennings | 210/697 |
| 3,520,813 | 7/1970 | Hansen et al. | 252/85 |
| 4,442,009 | 4/1984 | O'Leary et al. | 210/697 |
| 4,575,425 | 3/1986 | Boffardi et al. | 210/697 |
| 4,640,793 | 2/1987 | Persinski et al. | 252/82 |
| 4,652,452 | 3/1987 | Hiatt et al. | 426/16 |
| 4,872,995 | 10/1989 | Chen et al. | 210/699 |
| 5,062,962 | 11/1991 | Brown et al. | 210/698 |
| 5,177,009 | 1/1993 | Kampen | 435/161 |
| 5,256,332 | 10/1993 | Kessler | 252/396 |
| 5,368,740 | 11/1994 | Zidovec et al. | 210/697 |

*Primary Examiner*—Peter A. Hruskoci
*Assistant Examiner*—Betsey J. Morrison
*Attorney, Agent, or Firm*—Alexander D. Ricci; Richard A. Paikoff

[57] ABSTRACT

A method of inhibiting the precipitation and deposition of calcium oxalate scale in an aqueous system is disclosed, in which an effective amount of a combination of a high molecular weight lignosulfonate compound and a phosphate compound is added to the system.

6 Claims, No Drawings

INHIBITION OF CALCIUM OXALATE SCALE IN AQUEOUS BASED SOLUTIONS

BACKGROUND OF THE INVENTION

Most commercial water contains alkaline earth metal cations, such as calcium, magnesium, etc., and anions such as carbonate and oxalate. When combinations of these anions and cations are present in concentrations which exceed the solubility of their reaction products, precipitates form until their product solubility concentrations are no longer exceeded. For example, when the concentrations of calcium ion and oxalate ion exceed the solubility of the calcium oxalate reaction product, a solid phase of calcium oxalate will form as a precipitate.

Solubility product concentrations are exceeded for various reasons, such as evaporation of the water phase, change in pH, pressure or temperature, and the introduction of additional ions which can form insoluble compounds with the ions already present in the solution. As these reaction products precipitate on the surfaces of a water carrying system, they form scale. Scale prevents effective heat transfer, interferes with fluid flow, facilitates corrosive processes, and harbors bacteria. Scale is an expensive problem in many industrial water systems, causing delays and shutdowns for cleaning and removal.

Calcium oxalate is a common substituent of scale forming on the metallic surfaces of apparatuses used for thermal treatment of aqueous solutions and suspensions. It is known that calcium oxalate scale can be removed by washing pipes, tubes, or other metallic surfaces upon which calcium oxalate deposits have formed with dilute aqueous acid solutions, such as hydrochloric acid or nitric acid solutions. However, due to the limited solubility of calcium oxalate in these acids, repeated washings of extended durations are necessary. Thus, acid washing constitutes a costly and time-consuming operation. Acid washing also deteriorates equipment.

Corn derived ethanol is a predominately aqueous stream (80–90% water) which is typically produced by continuous fermentation in which glucose is converted by yeast or other microorganisms into ethanol. The fermentation feed streams (including starch or glucose, light steepwater, dilution water, and fermentation backset) contain varying concentrations of calcium and oxalate ions. It is the combination of these streams and the temperature/pH conditions in fermentation that result in calcium oxalate precipitation in the process. These crystals coalesce and form deposits on equipment, which reduce production efficiency and capacity. Extended shutdowns are typically needed to physically remove these deposits.

DETAILED DESCRIPTION OF THE INVENTION

We have found that calcium oxalate scale may be adequately controlled by adding to the desired aqueous system an effective amount of a high molecular weight lignosulfonate compound and a phosphate compound. High molecular weight lignosulfonates from the sulphite process (Ufoxane 2, molecular weight 55,800, hereinafter lignosulfonate A, and Ultrazine Na, molecular weight 63,600, hereinafter lignosulfonate B, both available from Lignotech) have been found to be especially effective for purposes of the present invention.

In a preferred embodiment of the present invention, a combination of from about 0.1 to about 100 ppm of lignosulfonate compound and a hexametaphosphate, based on one million parts of the aqueous system, is added to the system in need of treatment.

By high molecular weight lignosulfonate, it is meant a molecular weight of at least about 50,000. A molecular weight range of from about 55,000–65,000 is preferred.

The following concentration ranges may be employed:

lignosulfonate 0.1–100 ppm, preferably 50 ppm.
phosphate 0.1–100 ppm, preferably 50 ppm.

The lignosulfonate compound noted above was also found to effectively disperse calcium oxalate crystals which precipitate in an aqueous ethanol solution in the corn-to-ethanol production process, as described below.

EXAMPLES

Two hindered settling tests were conducted in order to identify calcium oxalate dispersants, and then to evaluate the effect of pH on these dispersants.

The slurry synthesized for the tests contained 10% w/w calcium oxalate, 12% w/w ethanol and 2000 ppm phosphate. The high phosphate level was needed to match conditions in field process streams (1800–2000 ppm). Note that despite this high concentration, field mineral deposits are composed entirely of calcium oxalate since, at a pH of 3.75, all phosphate exists as phosphoric acid and phosphate salt precipitation does not occur. However, such phosphate levels can affect the activity of dispersants by adsorbing onto the surface of the solids and either alter the surface charge or compete with the dispersant for absorption sites.

Both tests involved adjusting the pH of the slurry to 3.75 and placing 50 ml aliquots of the slurry in 50 ml stoppered graduated cylinders. Treatment was added at a rate of 250 ppm active, the cylinders were stoppered, inverted and the contents allowed to settle. The height of the solids/liquid interface was recorded at regular intervals.

Additional steps for the second (pH dependency) test included measuring the pH of the slurries after the test was completed to determine if it was between 3.8 and 4.4. If the pH was outside this range, the pH of the treatment solution was adjusted to approximately 4.0 and the test repeated. Experimental results are found in Tables I and II.

TABLE I

Calcium Oxalate Batch Hindered Settling Tests[1]

Conditions: 250 ppm Active Treatment
20 min. settling time
10% w/w $CaC_2O_4$
T = ambient
pH = 3.75
2000 ppm phosphate

| Treatment | Height of Interface (mls) | | |
|---|---|---|---|
| | t = 2 min | t = 10 min | t = 20 min |
| Control (avg. of 9 runs) | 45.5 | 31.2 | 20.9 |
| Lignosulfonates: | | | |
| Polyfon ® H[2] | 50 | 45 | 37 |
| Lignosulfonate A | 50 | 43 | 37 |
| Lignosulfonate B | 50 | 42 | 34 |

[1]pH not readjusted after addition of treatment
[2]Kraft lignin, commercially available from Westvaco, molecular weight 7000

TABLE II

Calcium Oxalate Batch Hindered Settling Tests[1]

Conditions: 250 ppm Active Treatment
20 min. settling time
10% w/w $CaC_2O_4$
T = ambient
pH = 3.75
2000 ppm phosphate

| Treatment | Height of Interface (mls) | | |
|---|---|---|---|
| | t = 2 min | t = 10 min | t = 20 min |
| Control (avg. of 17 runs) | 45.5 | 31.2 | 20.1 |
| Lignosulfonates: | | | |
| Polyfon H[2] | 47 | 36 | 27 |
| Lignosulfonate A | 50 | 50 | 50 |
| Lignosulfonate B | 50 | 50 | 50 |

[1]pH readjusted after addition of treatment
[2]Kraft lignin, commercially available from Westvaco, molecular weight 7000

A treatment which yielded greater interface heights than the control experiments was considered a calcium oxalate dispersant. The above tests indicated that the high molecular lignosulfonates effectively disperse calcium oxalate crystals independent of pH, whereas a low molecular weight Kraft lignosulfonate only exhibited calcium oxalate dispersant activity when the system pH was allowed to rise.

Heat Exchanger Simulations

The chemical changes associated with fermentation of glucose to ethanol release heat energy in significant amounts per pound of alcohol produced. In order to reject this heat and control process temperatures, each fermentation vessel is typically fitted with a recirculation cooling loop. As the calcium oxalate fouls the equipment surfaces, the heat exchangers on these loops lose their ability to cool the process stream through both partial blockage to process flow and degradation of heat transfer efficiency.

In order to simulate cooler fouling, a once-through heat exchanger apparatus was designed. This apparatus consisted of a tube-in-tube heat exchanger with the process fluid passing inside the inner tube and cooling water passing through the outer tube. Two separate ethanol solutions were fed to the heat exchanger simultaneously, one of which contained 200 ppm of oxalate ion, with the other containing 40 ppm of calcium ion (concentrations are about twice those encountered in actual corn-to-ethanol processes). The exchanger was positioned for downflow service to avoid premature pluggage at the solution feed point inlet junction, which would prevent accumulation of deposits in the exchanger and mask the results of the anti-scalant testing.

The key parameter identifying the effect of the treatments is the hours on-line until pluggage. It was found that the calcium oxalate which formed as the two feed solutions passed through the apparatus would plate out on the inside of the inner tube, particularly around the discharge end of the inner tube. Eventually, the accumulation at the discharge end of the tube totally blocked the flow of fluids. Testing demonstrated that certain treatments had a pronounced effect on the length of time that the apparatus remained operating until the exchanger plugged. The results of these tests are found in Table III.

TABLE III

Calcium Oxalate Inhibition Studies
Heat Exchanger Experiments

| Treatment | Time to Plug Hours (avg.) |
|---|---|
| 25 ppm SHMP | 44 |
| 10 ppm SHMP | 57 |
| 5 ppm SHMP | 18 |
| 10 ppm Lignosulfonate A | 7 |
| 5 ppm SHMP + 5 ppm Lignosulfonate A | 23 |
| 5 ppm SHMP + 5 ppm Lignosulfonate B | 17 |
| 10 ppm SHMP + 5 ppm Lignosulfonate B | 39 |
| 10 ppm SHMP + 10 ppm Lignosulfonate A | 86 |

SHMP: Sodium hexametaphosphate

The above tests show the superior results achieved by combining individual components. A particularly preferred embodiment of the present invention (10 ppm SHMP+10 ppm Lignosulfonate A) was found to be especially effective.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. A method of inhibiting the precipitation and deposition of calcium oxalate scale in an aqueous alcohol fermentation stream containing calcium and oxalate ions, comprising adding to said alcohol fermentation stream about 0.1 to 100 ppm lignosulfonate compound having a molecular weight of at least about 50,000 and about 0.1 to 100 ppm of a phosphate compound.

2. The method as recited in claim 1 wherein the molecular weight of said lignosulfonate compound is from about 55,000–65,000.

3. The method as recited in claim 1 wherein said phosphate compound is sodium hexametaphosphate.

4. In a system for the production of ethanol from corn, a method for reducing the deposition of calcium oxalate on the surfaces of processing equipment in contact with an alcohol fermentation stream containing calcium and oxalate ions in said system, which comprises adding to said alcohol fermentation stream about 0.1 to 100 ppm of a lignosulfonate compound having a molecular weight of at least about 50,000 and about 0.1 to 100 ppm of a phosphate compound.

5. The method as recited in claim 4 wherein the molecular weight of said lignosulfonate compound is from about 55,000–65,000.

6. The method as recited in claim 4 wherein said phosphate compound is sodium hexametaphosphate.

* * * * *